United States Patent [19]

Ugo

[11] 4,071,979

[45] Feb. 7, 1978

[54] SENSOR SHOE FOR TIRE GRINDING MACHINE

[75] Inventor: John Walter Ugo, Warren, Mich.

[73] Assignee: Uniroyal, Inc., New York, N.Y.

[21] Appl. No.: 771,213

[22] Filed: Feb. 23, 1977

Related U.S. Application Data

[63] Continuation of Ser. No. 596,868, July 17, 1975, abandoned.

[51] Int. Cl.² .............................................. B24B 5/00
[52] U.S. Cl. ........................... 51/106 R; 51/DIG. 33; 73/146
[58] Field of Search .................... 73/146; 51/DIG. 33, 51/106 R; 33/147 L, 147 N, 148 H, 178 E

[56] References Cited

U.S. PATENT DOCUMENTS 3,935,676  2/1976  Kline et al. .................... 51/106 R Primary Examiner—Donald O. Woodiel
Attorney, Agent, or Firm—Lawrence E. Sklar

[57] ABSTRACT

A pivotable sensor shoe in a tire grinding machine for tracking the tread surface of a pneumatic tire. The sensor shoe comprises a pivot point and a curved tracking surface. The tracking surface includes a minimum length long enough to provide point contact with the tread surface at opposite ends of the tracking surface length. The tracking surface has an arc whose radius is such that at least two point contact between the sensor tracking surface and the tire surface may be effected. This abstract is not to be taken as a complete position or as a limitation of the present invention, however, the full nature and extent of the invention being discernible only by reference to and from the entire disclosure.

12 Claims, 8 Drawing Figures

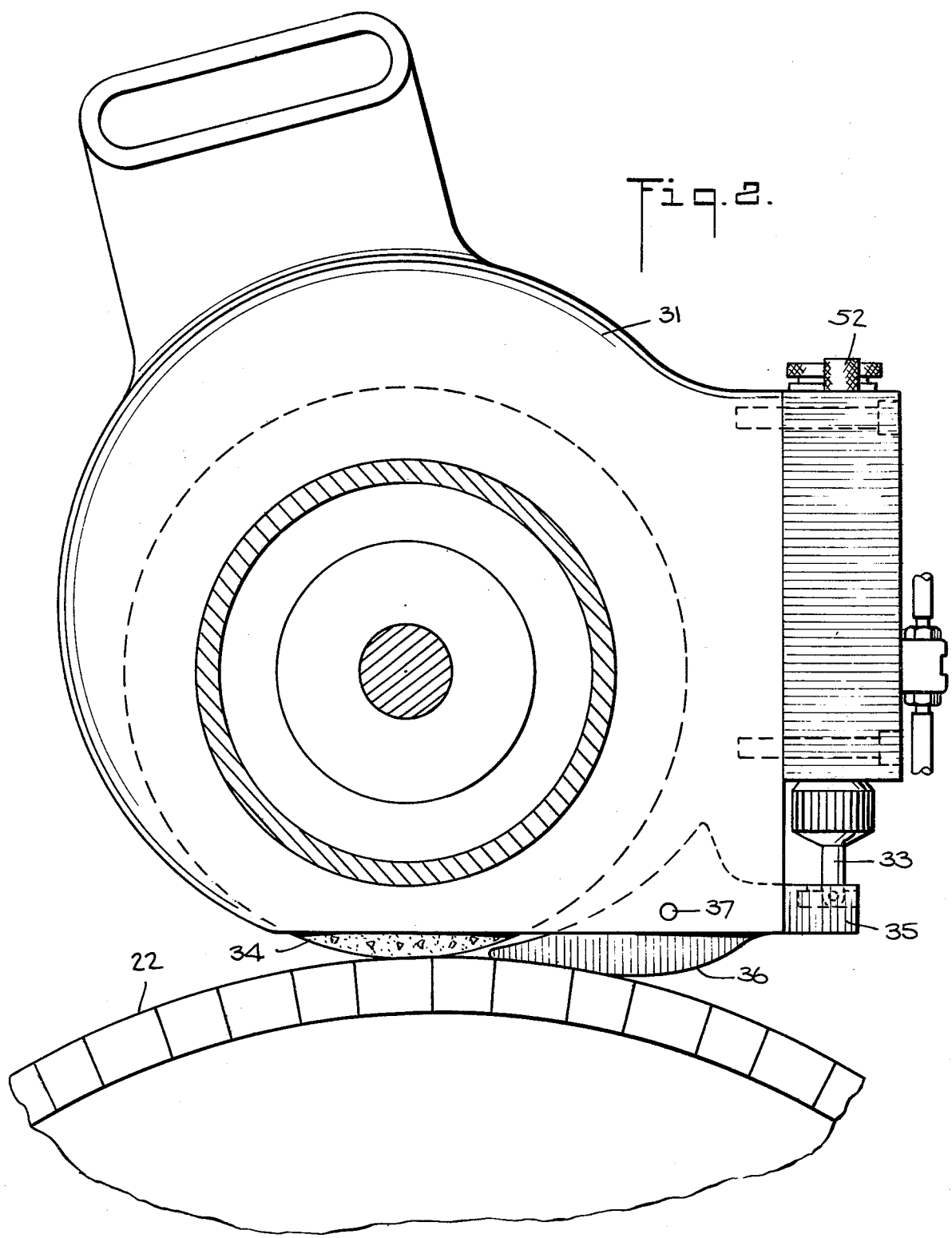

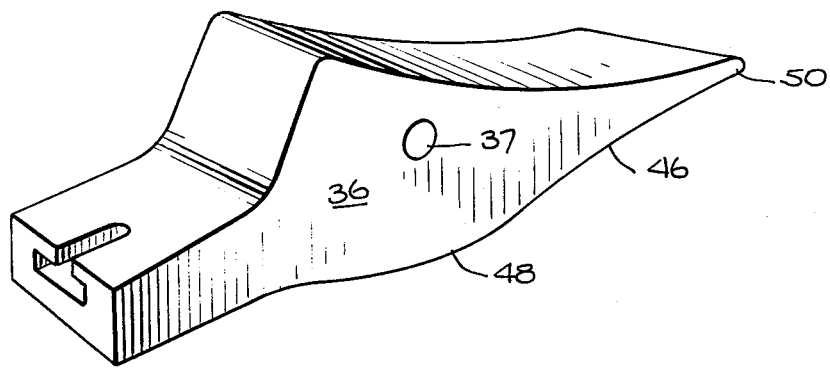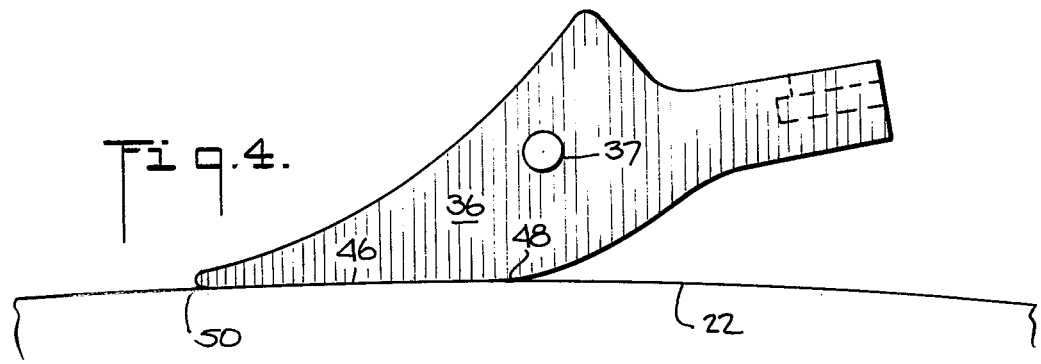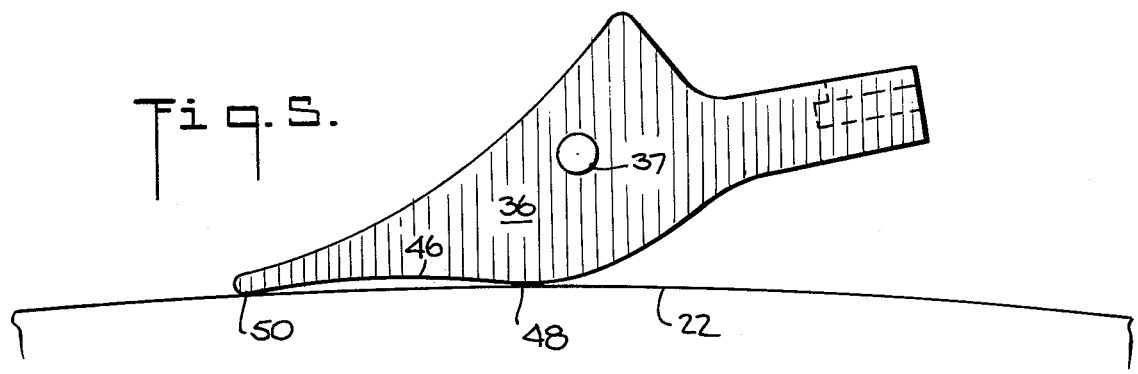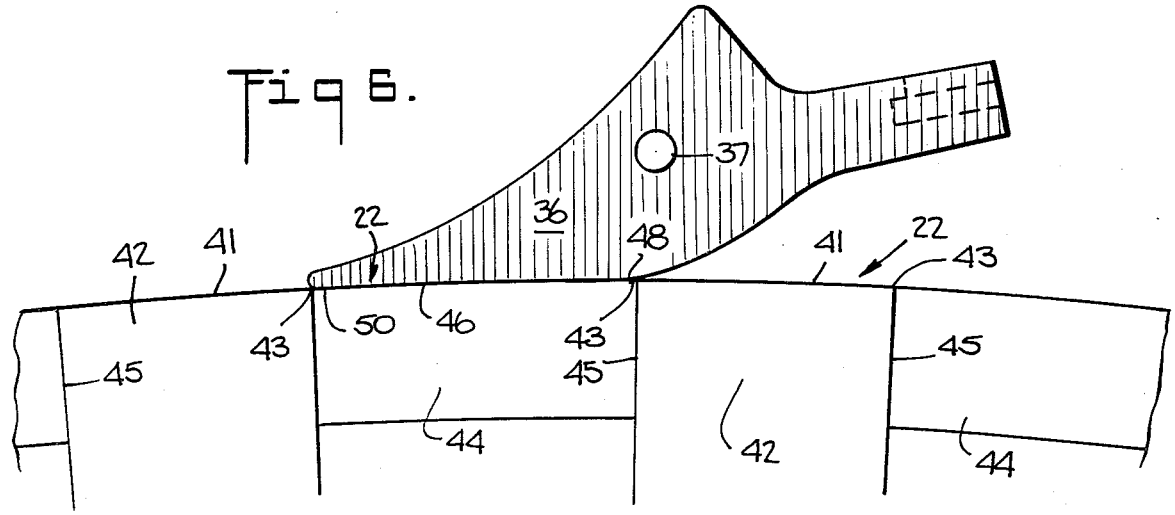

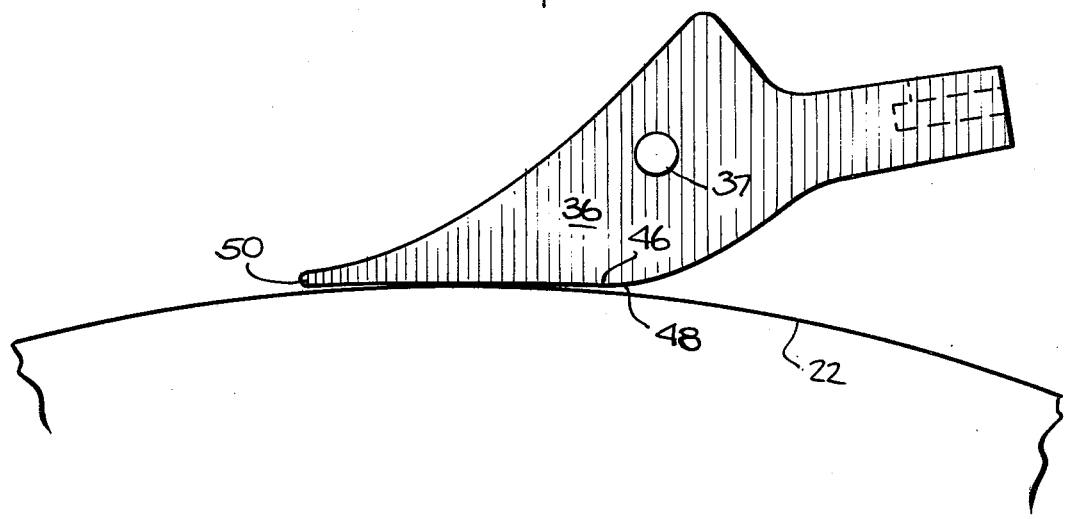
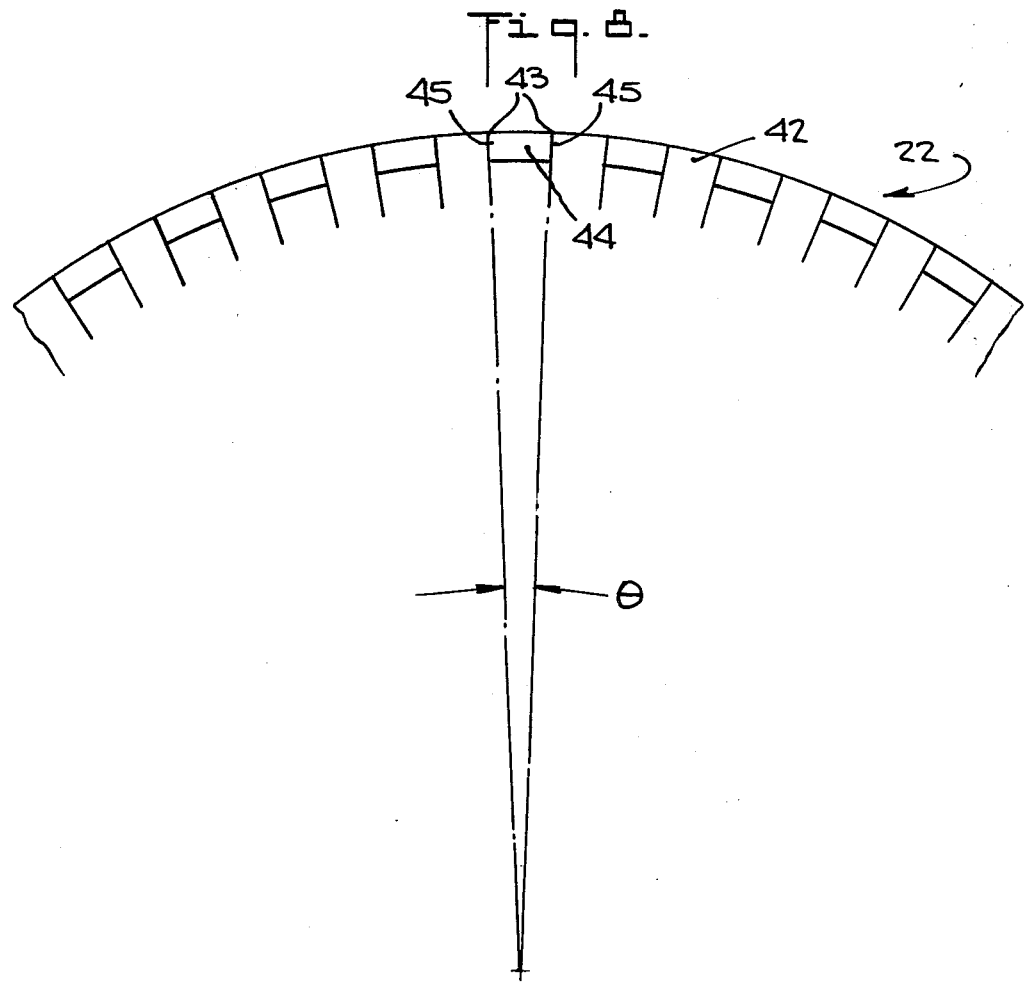

SENSOR SHOE FOR TIRE GRINDING MACHINE

This is a continuation of application Ser. No. 596,868, filed July 17, 1975, now abandoned.

BACKGROUND OF THE INVENTION

The instant invention relates to tire grinding machines and more particularly to sensor shoes which locate the surface of tires.

Improvement of force variation on pneumatic tires is done on uniformity machines known as tire uniformity grinders or tire uniformity optimizers. Generally, small truck tires, unlike many conventional passenger tire tread designs, are "luggy" and present an interrupted or discontinuous surface along their periphery, particularly in the shoulder region. This type of tread design, as well as tread designs of traction-type tires and so-called mud and snow tires, create special problems when processed through the tire uniformity machines.

Tire uniformity machines are equipped with two or three grinding wheels. In the case of two grinding wheels each of the wheels is located in a position essentially adjacent to each tire shoulder (a spacing of about 0.001 or 0.002 inch between the grinding wheel and the tire being preferred). In the case of three grinding wheels, such as disclosed in U.S. Pat. No. 3,841,033, a third grinding wheel located essentially contiguous to the central portion of the tire tread, is added to the two-wheel machines. Immediately in front of the grinding wheels are sensors, each with a suitable reference pick-up or probe. The essential purpose of this reference probe is to find the surface of the tire.

The tire uniformity machines presently available are equipped with standard sensor shoes for tracking tire tread surfaces. These shoes perform reasonably well on passenger tires with conventional treads. However, when they are used on lug-type tire treads they drop into and out of the grooves between the lugs as the sensor attempts to track the rotating tire, which may be rotating at a speed of 60 revolutions per minute or more. The rapid up and down movement of the sensors causes the grinding wheels to chatter, which frequently results in damaged treads, such as chunk-out or rounding-off of the edges of the lugs. In some cases the sensors and grinding assembly may become damaged.

Heretofore, the shape of the sensor shoe or probe was not critical and was usually not more than a point. However, with recent requirements for improvement in force variation in pneumatic tires, the prior art sensor shoe was proven inadequate. The present invention therefore provides a sensor shoe with a unique, arcuately contoured shape, which tracks the tire tread surface and bridges any intermittent voids or grooves along the surface to tires.

SUMMARY OF THE INVENTION

The inventon provides a pivotable sensor shoe in a tire grinding machine for tracking the tread surface of a pneumatic tire. The sensor shoe comprises a pivot point and a curved tracking surface, the tracking surface having a minimum length long enough to provide point contact with the tread surface at opposite ends of the tracking surface length. The tracking surface has an arc whose radius is preferably equal to the radius of the tire surface. However, the arc of the tracking surface may be greater or less than the radius of the tire surface whereby at least two point contact between the sensor tracking surface and the tire surface is effected.

BRIEF DESCRIPTION OF THE DRAWINGS

FIG. 2 is an enlarged, cross-sectional view in the horizontal plane of a grinder wheel and sensor shoe according to the instant invention.

FIG. 3 is an enlarged, perspective view of a sensor shoe in accordance with the instant invention.

FIG. 4 is an enlarged, plan view of a sensor shoe having the optimum arc for the tire surface.

FIG. 5 is an enlarged, plan view of a sensor shoe having two-point contact with the tire surface.

FIG. 6 is a plan view of a sensor shoe and a tire surface having a multiplicity of grooves.

FIG. 7 is an enlarged plan view of a sensor shoe having a tracking surface radius larger than that of the tire tread surface.

FIG. 8 is an illustration showing the angular width of tread grooves.

DESCRIPTION OF THE PREFERRED EMBODIMENT

Figure 1:
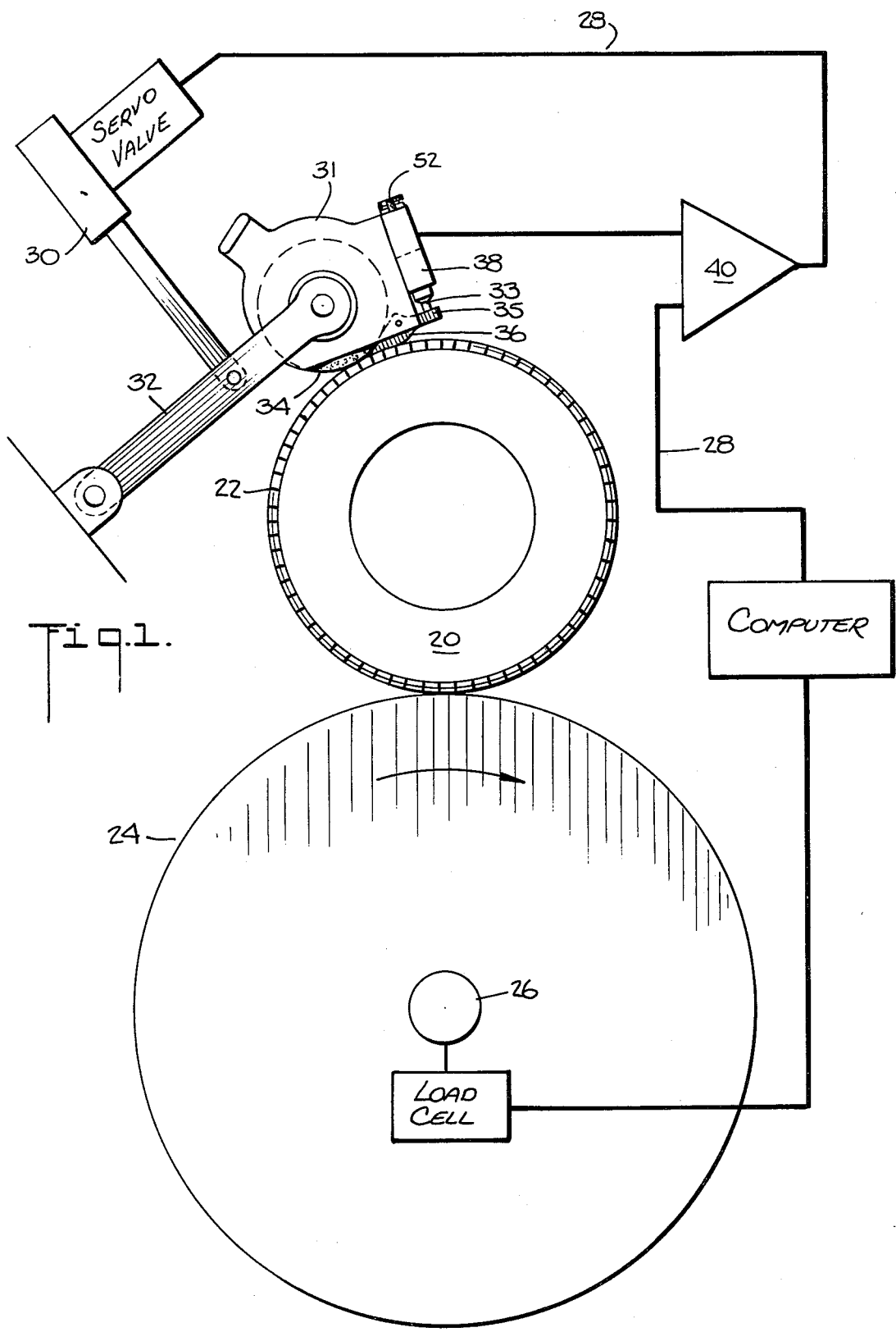
FIG. 1 is a schematic illustration of major parts of a tire grinding system for improvement of force variations in a pneumatic tire.

In describing the preferred embodiments of the instant invention, reference is made to the drawings, which illustrate the major components of a grinding system for improvement of force variations in a pneumatic tire. FIG. 1 illustrates a tire 20 having a tread surface 22, the tire 20 being rotatably mounted on a rotatable shaft 26, is positioned against tire 20 and applies an appropriate load to the tire. The tire 20 is driven by a motor (not shown) and, in turn, rotatably drives the road wheel 24. Radial and lateral forces on the tire 20 are sensed by the load cells engaging the shaft 26 of road wheel 24, as shown in FIG. 1. A force signal is transmitted from the load cells to the computer (FIG. 1). The computer produces a force correction signal through line 28 to the hydraulic cylinder 30 which drives a moveable arm 32 to which is attached a grinding wheel 34 having a shroud 31. A pivotable surface sensor shoe 36 is mounted on the shroud 31 and pivots about an axis 37. The sensor shoe 36, through a feedback servo-loop system (see top portion of FIG. 1), automatically positions the grinding wheel 34 substantially adjacent (a spacing of 0.001 or 0.002 inch between the grinding wheel and the tire being preferred) the tire tread surface 22, so that the infinitesimal distance between the grinding wheel 34 and the tread surface 22 remains constant regardless of the eccentricity of the tire 20.

More specifically, the feedback servo-loop system operates by means of the sensor shoe 36 to control the servo valve and the hydraulic cylinder 30, so that the grinding wheel is substantially adjacent the tire tread surface 22. The deviation of the grinding wheel 34 from this adjacent position is under the control of the force variation signal only. Tire improvement for force variation is independent of tire eccentricity. The sensor shoe 36 is attached to the moveable pick-up arm 33 of a varaible voltage transformer 38 and is in contact with tread surface 22 by means of tracking surface 46. The electrical signal from the variable voltage transformer 38 to a servoamplifier 40 forms a closed loop system by way of the amplifier 40 and the servo valve for control of the hydraulic cylinder 30.

The movement of the sensor shoe 36 generates a signal, measured in volts, which is proportional to its movement. When a recessor void (such as a tire groove) in the tread surface 22 of the tire is reached, the sensor shoe 36 does not, as would a conventional sensor shoe, fall into the recess. The novel design of the sensor shoe 36 thus prevents movement of the shoe 36 into the tire 20 and the consequent generation and sending of a signal which would cause the grinding wheel to advance into the tire, whereby undesirable grinding is averted.

The position of the grinding wheel 34 and sensor shoe 36 are adjustable relative to the tread surface 22 by varying the position of the pivotally moveable arm 32. The sensor shoe 36 is also moveable independently of the grinding wheel 34 in directions toward or away from the tire 20 by pivotal movement of the shroud 31. The angular position of the sensor shoe 36 is further variable about its axis 37 by an adjusting screw 52 which moves the arm 35 of the shoe 36 in vertical directions relative to the view of FIG. 2. The purpose of this latter adjustment is to locate the curved tracking surface 46 of the shoe 36 in a position of optimum contact between the tread surface 22 and the tracking surface 46, as will be discussed in greater detail hereinafter. The necessity of the foregoing positioning means arises from the desirability of having a single apparatus which can accept tires having a range of different diameters. Thus, for example, if it is desired to change the tire uniformity machine from a condition in which it senses and corrects force variations in tires of a certain diameter to a condition in which it will sense and correct force variations in smaller diameter tires, the position of the sensor shoe 36 must be changed. In going from a large to a smaller diameter tire, the sensor shoe 36 must be moved toward the tire by pivotal movement of the shroud 31. The angle of the shoe 36 is then adjusted by the screw 52 so that the desired contact position of the curved tracking surface 46 and tread surface 22 is attained.

The optimum position of the sensor shoe tracking surface 46 should be such that the mid-point of the tracking surface, in effect, controls the system mechanical gain. This position of the tracking surface 46 can be obtained by adjusting the position of the sensor shoe 36 by screw 52 so that the chord of the tracking surface arc connecting the ends 48 and 50 of the tracking surface 46 is perpendicular to a radial line of the tread surface extending from the axis of the tire. With this positioning of the tracking surface 46, two point or greater contact between the tread surface 22 and the tracking surface 46 will be maintained. Either of the ends 48 and 50 of the tracking surface 46 will not along follow the tire surface and "fall" into the tread grooves. The contact of either of the ends 48 or 50 will not establish the length of the lever arm between the tracking surface 46 contact point and the axis 37 of sensor shoe 36. Rather, the lever arm will have a length from the axis 37 to a point approximately midway between the extremities of the contact of the tracking surface 46 with the tire surface 22.

It may be noted that the position, as described above, of previously known tracking shoes is unimportant since the tracking surface of such shoes is short and therefore it is not possible to prevent them from moving into tread grooves. Also, with such short tracking surfaces, there is virtually no alternative length for the lever arm for controlling system mechanical gain and so position adjustments as described above are not required.

The optimum arc of the tracking surface 46 is the arc of the tire surface, i.e., the radius of the tire tread surface 22 and the radius of the tracking surface 46 are equal, as seen in FIG. 4. A less preferred arc of the tracking surface 46, shown in FIG. 5, is an arc whose radius is less than that of the tire tread surface 22, so that two point contact between the tracking surface 46 and tire tread surface 22 is effected. Another less preferred arc of the tracking surface 46 shown in FIG. 7, is an arc whose radius is greater than that of the tire tread surface 22, so that a relatively short curved line of contact is effected between the tracking surface 46 and the tire tread surface 22.

The front end 48 of the tracking surface in contact with the tire surface must be on the same side of the axis 37, in a circumferential direction, as the rear end 50, and the front end 48 must be spaced, in a circumferential direction, a proper minimum distance from the axis 37 such that there is a sufficient lever arm to give adequate gain response. When the front end 48 of the tracking surface 46 is too close, circumferentially, to the axis, the sensor shoe 36 will not pivot.

The sensor shoe 36 may be used for all types of tread designs including treads having any combination of ribs and grooves running in generally lateral or circumferential directions in the tread surface, as well as lug type tires. It should be understood that ribs and lugs are formed of spaced apart projections in the tread rubber of a tire and that grooves are voids or recesses between the projections. Each projection has a surface and the surface of all the projections, taken together, form the surface of the tire tread.

As previously stated, the sensor shoe 36 has a curved tracking surface 46. The tracking surface 46 is curved toward the tire 20 when in a tracking position and, as shown in FIGS. 4 through 7, must be long enough to bridge the grooves in a tire surface as the tire rotates in contact with the tracking surface. In effect, the tracking surface must be of such length that greater than single point contact, e.g., two point contact, is maintained while the tracking surface 46 is bridging a groove. It should be noted that greater than one point contact is considered to be two or more points of spaced apart contact or a continuous line of contact where the line is formed from a succession of close together points. Also it can be appreciated from the length requirement of the tracking surface 46 that it is not intended to be supported on the tread surface by its sides edges, as in the case of a circumferential groove narrower than the tracking surface width.

With reference to FIG. 6, a tire is shown having lugs 42 each having surfaces 41, an overall tread surface 22, and grooves 44 having circumferentially opposite and spaced apart side walls 45. The intersection of the groove sidewalls 45 with the tread surface 22 forms corners 43. The tracking surface 46 of the sensor shoe 36 bridges a groove 44 and effects point contact with lugs 42 at the opposed front and rear ends 48 and 50 respectively of the tracking surface length. The maximum length of the tracking surface is determined by the desired sensitivity of the system. A greater length will integrate more surface variations and thereby provide less sensitivity.

The sensor shoe 36 has its greatest use in conjunction with tires having particularly wide grooves running in a generally lateral direction, e.g., passenger mud and snow tires and truck tires. In any given tire tread design, the circumferential dimension of the grooves, lugs and ribs may increase proportionately with an increase in diameter of the tire. Thus, the length of the tracking surface 46 should also increase as tire diameter (or radius) increases. The groove width and therefore the length of the tracking surface can be defined in temrs of the length of the arc subtended by two radii extending from the axis of the tire and having a specific angular spacing $\theta$. The angular spacing $\theta$ is determined by the points of intersection of the two radii with the corners 43 formed by the surface 22 of the tire tread and the circumferentially opposite side walls 45 of a groove at the points on the walls that are circumferentially closest together (see FIG. 8). A typical tire with which the sensor shoe 36 is intended to be used is made in inflated diameters of approximately 26.4 inches, 20.6 inches and 31.4 inches. The corresponding groove widths in a circumferential direction are approximately 0.808 inches, 0.890 inches, and 0.969 inches and the corresponding angle $\theta$ between radii subtending these arcuate groove widths is approximately 3.5°.

Although the preferred embodiments of the invention have been described in terms of grinding to improve force variations, the improvements herein can be employed when grinding to improve tire eccentricity also, in which case tracking of the tire would not be needed. Also, though only shoulder grinders were illustrated, a center grinder could be employed with an accompanying sensor shoe.

The invention disclosed will have many modifications which will be apparent to those skilled in the art in view of the teachings of this specification. It is intended that all modifications which fall within the true spirit and scope of this invention be included within the scope of the appended claims.

What is claimed is:

1. In a machine for grinding the surface of the tread of a rotating pneumatic tire, said machine having a grinding wheel and a sensor shoe adjacent said wheel for tracking said tread surface and for positioning said grinding wheel substantially adjacent said tread surface, and said tread having a plurality of spaced apart projections forming recesses therebetween, the combination comprising:
    a sensor shoe having a tracking surface for contacting said tread surface and for bridging said recesses during rotation of the tire, said tracking surface having a length curved toward said tire whereby greater than one point contact between the tread surface and the tracking surface may be effected; and
    means connected to the sensor shoe for positioning said shoe such that optimum contact between the tread surface and tracking surface may be attained.

2. The combination according to claim 1 wherein the curved tracking surface has an arc whose radius is equal to the radius of the tire surface.

3. The combination according to claim 1 wherein the curved tracking surface has an arc whose radius is less than the radius of the tire surface, whereby two point contact between the sensor tracking surface and the tire surface may be effected.

4. The combination according to claim 1 wherein:
    said recesses form a multiplicity of grooves in said tire tread; and
    the length of the tracking surface is long enough to bridge one of the grooves.

5. The combination according to claim 4 wherein the tracking surface has a width narrower along its entire length than the width of the bridged groove and the tracking surface is in contact at not less than two points along its length with tread projections separated by said bridged groove.

6. The combination according to claim 1 wherein the length of said tracking surface is the length of the arc subtended by two radii extending from the axis of the tire at a predetermined angular spacing.

7. The combination according to claim 6 wherein said angular spacing is 3.5 degrees.

8. The combination according to claim 1 wherein:
    said curved tracking surface has opposite ends and a chord connecting said ends; and
    said positioning means locates the curved tracking surface relative to the tread surface with said chord pependicular to a radial line extending from the axis of the tire.

9. The combination according to claim 8 wherein:
    the radius of the curved tracking surface is equal to the radius of curvature of the tread surface; and
    the positioning means locates the tracking surface parallel to the tread surface.

10. The combination according to claim 8 wherein:
    the sensor shoe includes an axis disposed parallel to the tracking surface and transverse to the length of the tracking surface, said sensor shoe being pivotable about said axis; and
    the positioning means pivots the sensor shoe about said axis to locate the tracking surface.

11. The combination according to claim 10 wherein said tracking surface has front and rear ends, said ends being on the same side of said axis, in a circumferential direction.

12. In a machine for grinding the surface of the tread of a pneumatic tire, which tread has a plurality of spaced apart projections forming recesses therebetween; the combination comprising:
    a grinding wheel and means for driving the same;
    means for mounting the tire for rotation with the tread thereof in juxtaposition to said grinding wheel;
    a sensor shoe mounted adjacent said grinding wheel, said sensor shoe having a tracking surface which is engageable with said tread surface and has a length that, as viewed circumferentially of the tire along the tread, is sufficient to bridge the largest recess in the tread for providing greater than one-point contact between said tread surface and said tracking surface;
    means connected to said sensor shoe for adjusting the same to achieve optimum contact between said tracking surface and said tread surface; and
    means responsive to contact between said sensor shoe and said tread surface of the tire during rotation of the latter for properly positioning said grinding wheel in operative relation to said tread surface.

* * * * *